United States Patent [19]

Callens et al.

[11] Patent Number: 4,630,262
[45] Date of Patent: Dec. 16, 1986

[54] METHOD AND SYSTEM FOR TRANSMITTING DIGITIZED VOICE SIGNALS AS PACKETS OF BITS

[75] Inventors: Paul Callens; Claude Galand; Claude Gergaud, all of Cagnes-Sur-Mer; Philippe Noailly, Saint-Laurent-du-Var; Pierre Secondo, Saint Jeannet, all of France

[73] Assignee: International Business Machines Corp., Armonk, N.Y.

[21] Appl. No.: 736,187

[22] Filed: May 20, 1985

[30] Foreign Application Priority Data

May 23, 1984 [EP] European Pat. Off. ........ 84430015.2

[51] Int. Cl.$^4$ ............................. H04J 3/17; H04J 3/24
[52] U.S. Cl. ........................................ 370/81; 370/94; 370/110.1
[58] Field of Search ...................... 370/79, 80, 81, 94, 370/110.1

[56] References Cited

U.S. PATENT DOCUMENTS

| | | | |
|---|---|---|---|
| 4,100,377 | 7/1978 | Flanagan | 370/81 |
| 4,284,850 | 8/1981 | Clingenpeel | 370/81 |
| 4,382,296 | 5/1983 | Joyce et al. | 370/81 |
| 4,433,411 | 2/1984 | Gefroerer et al. | 370/81 |

Primary Examiner—Douglas W. Olms
Assistant Examiner—Wellington Chin
Attorney, Agent, or Firm—John B. Frisone

[57] ABSTRACT

A method of transmitting digitized voice signals as packets of bits in a digital transmission network to which a plurality of terminals acting as sources of voice signals are attached. The method includes, at the transmitting end and for each source, the steps of: a dividing the signal into successive, digitally-coded segments; performing a so-called source activity detection; and assembling the bits resulting from the coding operation into packets, each packet being provided with a header containing, in particular, a parity bit whose logic value is modified whenever an inactivity or long pause is detected. At the receiving end, detection of a change in the value of said parity bit causes the delivery of a packet of bits to the decoder/synthesizer to be delayed by a given time interval called retention delay.

24 Claims, 12 Drawing Figures

METHOD AND SYSTEM FOR TRANSMITTING DIGITIZED VOICE SIGNALS AS PACKETS OF BITS

DESCRIPTION

Technical Field

This invention relates to a system for transmitting digitized voice signals that uses, in particular, techniques in which the digitized voice signals are transmitted as packets of bits.

A number of known techniques may be used to enhance the productivity of digitized voice signal transmission facilities. For example, multiplexing techniques allow data from several sources to be concentrated on a single transmission line. Where the sources operate in an intermittent and random fashion, as in the case of telephone terminals, the number of sources connected to the transmission line through a network sometimes exceeds the number theoretically allowed by the instantaneous capacity of the line. In such cases, Digital Speech Interpolation (DSI) techniques are employed. In DSI, the data bits from a plurality of sources are assembled into packets that are then sent to their destinations through a transmission network. The time taken to travel from one end of the network to the other varies from packet to packet. However, voice transmissions are characterized in that they must take place in real time. Also, the packets of bits must be received as regularly as possibly to enable the receiver to properly reconstruct the original analog voice signal.

A characteristic of speech in conversations is the alternate occurrence of "talkspurts", or speaking periods, and pauses or silence periods of variable duration. The DSI techniques optimize the transmission channels by filling a given source's silence periods with the speaking periods associated with another source whose information is to be transmitted. To this end, a device called voice activity detector manages all of the devices used to encode and multiplex together the voice signals generated by the various sources. However, in view of the properties of both the human voice and the human ear, precautions must be taken to prevent unpleasant distortions of the reconstructed signal received by an user. In this respect, it is important that the respective durations of the pauses should not be modified. The effects of short pauses on message intelligibility will be discussed later on.

It is, therefore, an object of this invention to provide a system for transmitting digitized voice signals in the form of packets of bits, which uses DSI techniques and incorporates means for generating at the receiving end reconstructed voice signals that are as pleasant to the ear and as faithful as possible.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
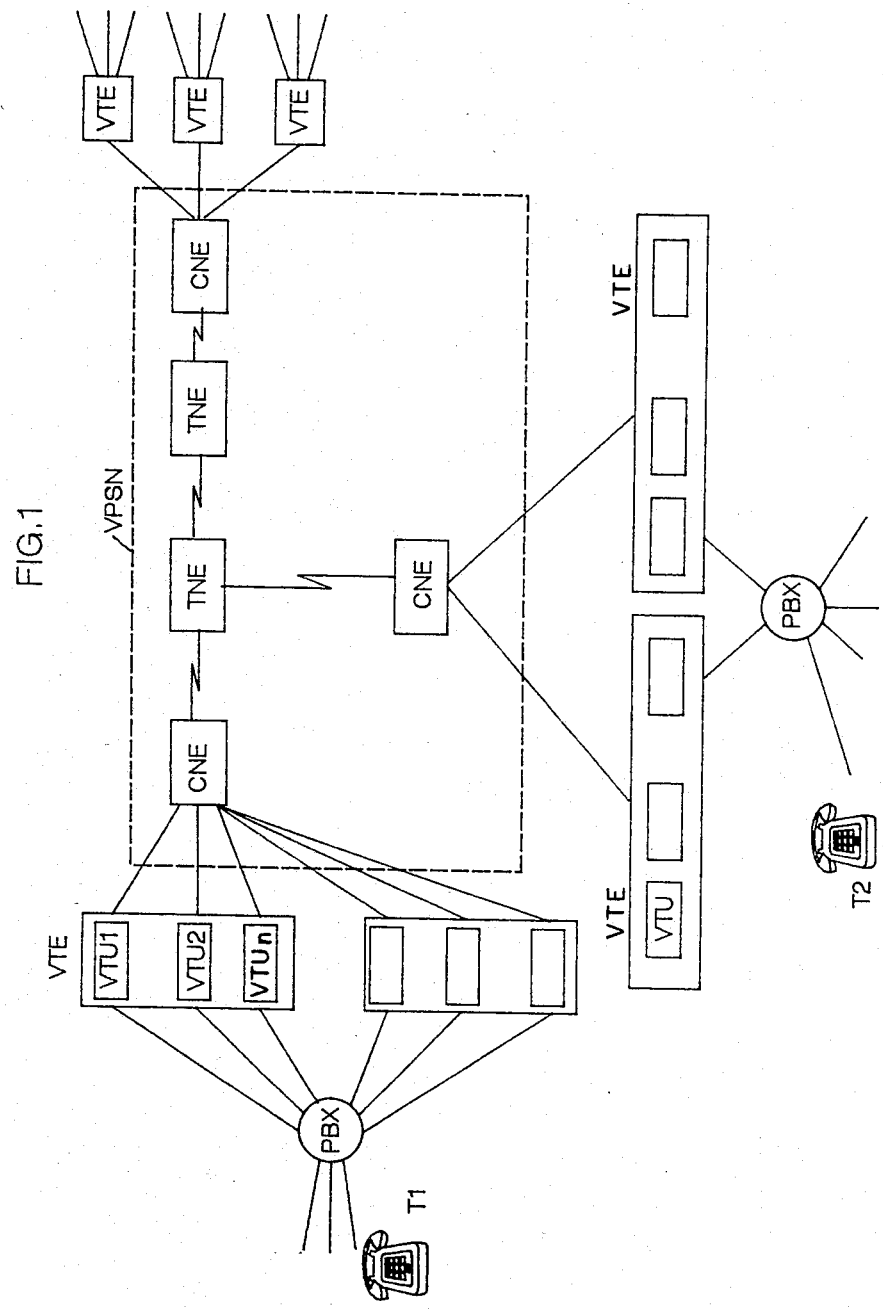
FIG. 1 is a schematic diagram of a communication network in which the invention finds application.

Referring now to FIG. 1, a schematic diagram of a type of communication network in which the invention finds application is shown. Subscriber telephone sets or terminals (T) are attached to switching units (PBXs). Output lines from the PBXs are assigned at a given instant to telephone sets in operation and pass through voice terminal units (VTUs) which perform a digital coding, and, as the case may be, a compression, of the voice signals. Each VTU divides the incoming voice signal into 20-ms segments each of which, when encoded, provides one block of bits. Encoding operations may be carried out, for example, by coders that use BCPCM (Block Companded PCM) techniques and may be of the type described in U.S. Pat. No. 4,216,354. As shown in FIG. 1, a plurality of VTUs, VTU1, VTU2, . . . , VTUn, are brought together in a voice terminal equipment (VTE). The purpose of a VTE is to manage the transfers of bits from the coders to the network and vice-versa and to perform additional functions such as telephone signaling, activity detection (VAD), etc. Each VTE incorporates a scanning means (not shown) which scans the attached VTUs sequentially to collect data blocks to be transmitted. Assuming that each VTE comprises eight VTUs, two blocks of bits resulting from the encoding of a 40 ms segment of voice signal would leave the VTE every 5 ms. These two blocks, to which delimiting, service, control and destination address bits are added, are then assembled to form a packet of bits which is sent to an input/output node (GNE) of a voice packet switching network (VPSN). The packets of bits are directed to their destinations through transit node equipments (TNEs). At each node, the address and service bits are read out to enable the packets to be transferred. Transfers from a node to another take place after a packet has been placed on a queue and removed therefrom, with the length of the successive queues varying with fluctuations in the volume of traffic. If the packets of bits were supplied as received, then the reconstructed voice message might be so distorted as to be unintelligible. Before describing the means that have been devised to overcome this difficulty, we shall describe in greater detail the operation of the above communication network. When the subscriber using telephone set T1 desires a connection to the subscriber using telephone set T2 and dials his number, an output line from the PBX to which T1 is attached is assigned to him in a conventional manner. This line is connected to a VTU within a VTE. This VTE looks up a table of connections (not shown) and selects an available one of the logic channels connecting the VTE to a network input node (GNE). The selected channel is then assigned to the connection that is being established. This process of selecting and assigning a channel is repeated from one node to the next one throughout the network VPSN. The transit nodes (TNEs) and network output nodes (GNEs) as well as the VTE to be assigned to the connection currently being established are thus defined. Once the VTE has been defined, the desired connection to T2 is established through a PBX and VTU, and will be maintained throughout the conversation taking place between the two subscribers.

Transfers from a node to another are effected through a number of queues whose length varies in accordance with fluctuations in the volume of traffic. For more details, reference should be made to European patent application No. 84430016.0 entitled "Buffer Device Used in a Voice Transmission Network", filed by the present applicant May 23, 1984.

Figure 2:
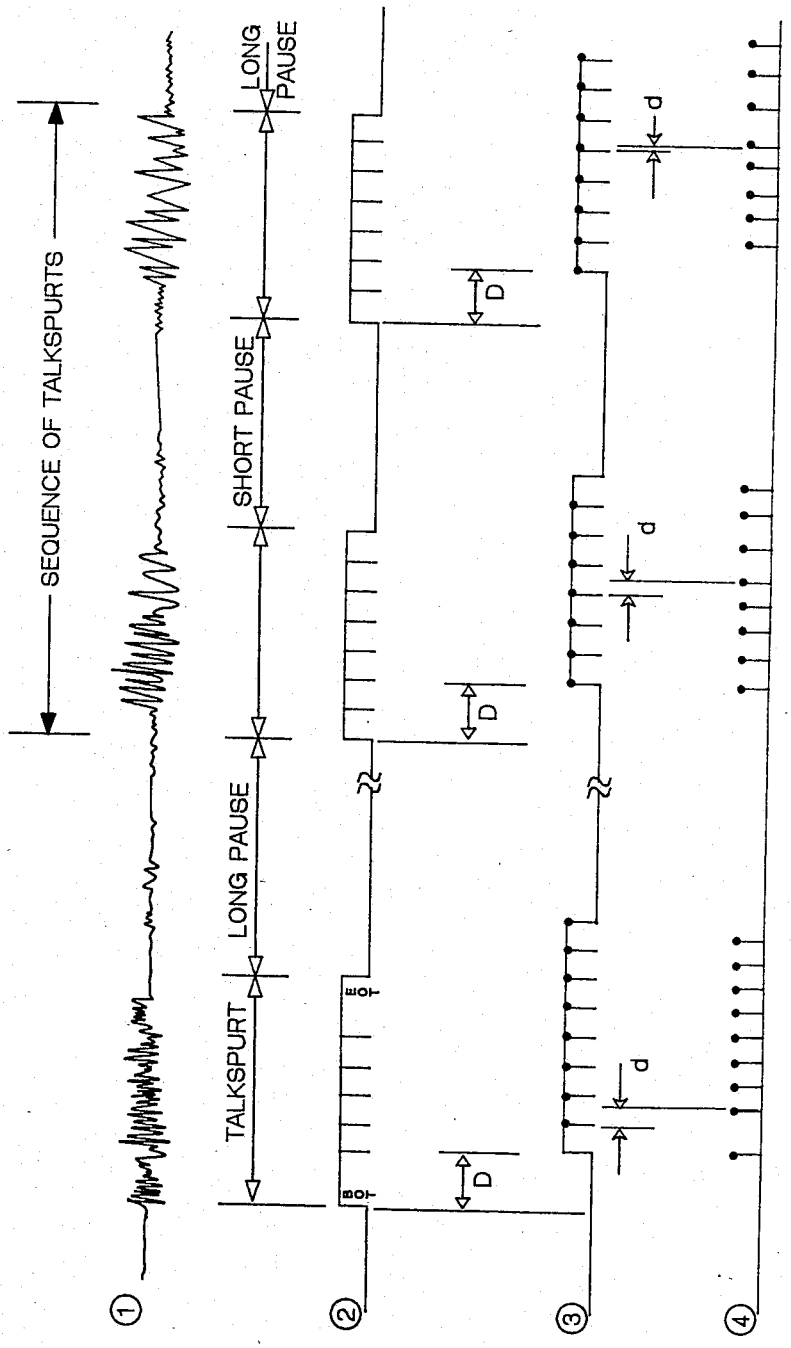
FIGS. 2 and 3 are diagrams illustrating the transmission of voice signals in the form of packets of bits.

As has been mentioned, queue length variations can perturb the signal receiving operations. FIG. 2 is a schematic illustration of the above phenomenon. Line 1 shows by way of example an analog signal applied to coder VTUi (where i=1 or 2 or n) associated with terminal T1. The waveform comprises speaking periods (or talkspurts) and periods of inactivity or pauses which are termed long or short depending on whether their duration exceeds or is less than a predetermined value of, for example, 1.28 second (32×40 ms). A sequence of talkspurts is defined here as the time interval between two long pauses. In principle, only the talkspurts are to be transmitted. More precisely, coder VTUi ignores the pauses while encoding the signal, but the associated VTE is informed of the pauses by a so-called activity detector (not shown) and eliminates the data corresponding thereto from the train of bits sent to the input node (GNE). The detector may be of the type described in the U.S. application No. 616,021 entitled "Activity Detection Method for a Voice Transmission System and Device for Implementing Said Method" filed by this applicant. Line 2 represents the bits to be transmitted in the form of blocks each corresponding to a 20-ms segment of VTU-encoded signal. The manner in which these blocks of bits are assembled into packets will be described later. Each packet will contain, in particular, the bits from two blocks. Note that the first packet in a talkspurt is designated BOT, and the last one, EOT. Line 3 shows the instants at which the packets should be received if the time interval for transmitting voice signals between T1 and T2 were fixed and equal to "D", for example. However, this, as previously mentioned, would not be realistic. A variable delay "d" in the transmission of the data bits is introduced, in particular, by the queues formed at the various nodes. Line 4 shows the probable instants at which the packets of bits would be received in actual operation.

Some packets may happen to be lost or may occasionally fail to be received in proper sequence. The receiver/decoder at the receiving end must therefore be capable of reconstructing as faithfully as possible the original voice signal shown in line 1 of FIG. 2.

Figure 3:
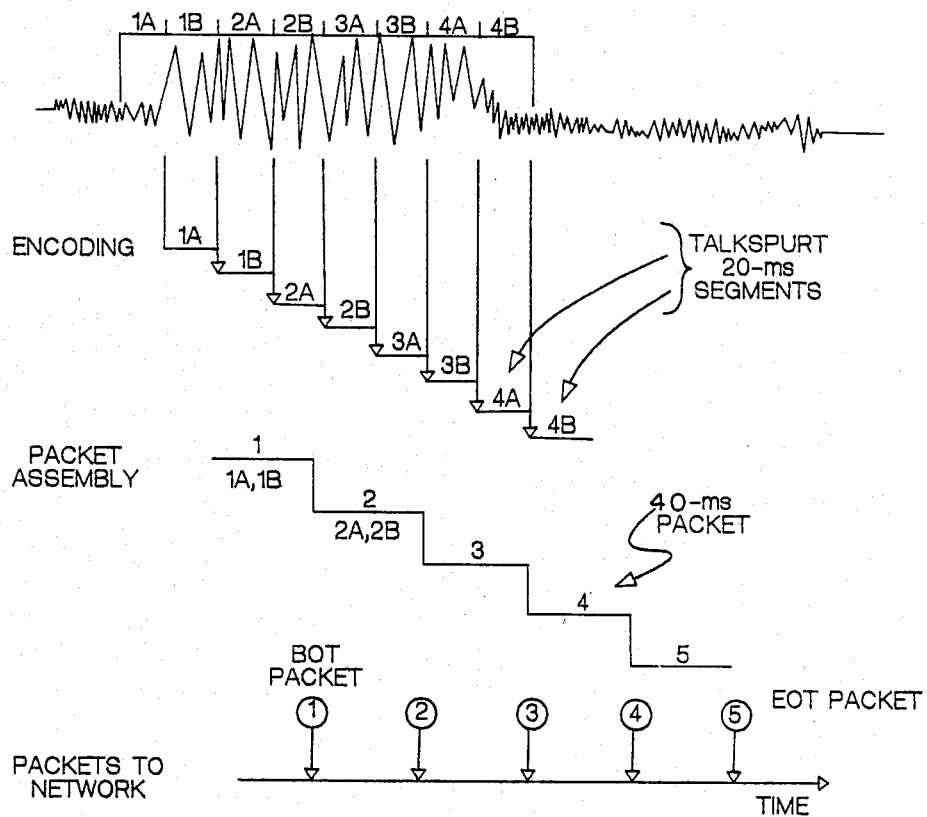

FIG. 3 illustrates in somewhat greater detail the processing of a talkspurt. Before it is transmitted to voice packet switching network VPSN, the talkspurt is divided into 20-ms segments 1A, 1B, 2A, 2B, etc. Each segment is digitized with a 20-ms delay. The actual processing steps are slightly different. The analog signal is first coded in binary using conventional PCM with 12 bits per sample, and is then compressed, using BCPCM, into 20-ms segments which are paired (1A and 1B; 2A and 2B; etc.) to be assembled into packets of bits. Each packet, containing 2×20 ms of voice signal, is then arranged in a HDLC or SDLC format, to be defined later, by the voice terminal equipment (VTE). The VTE incorporates a synchronous scanning means (not shown) for scanning the attached voice terminal units (VTUs). Every 40 ms, the scanning means collects a packet of bits from each active VTU for transmission to the network (VPSN).

Figure 4:
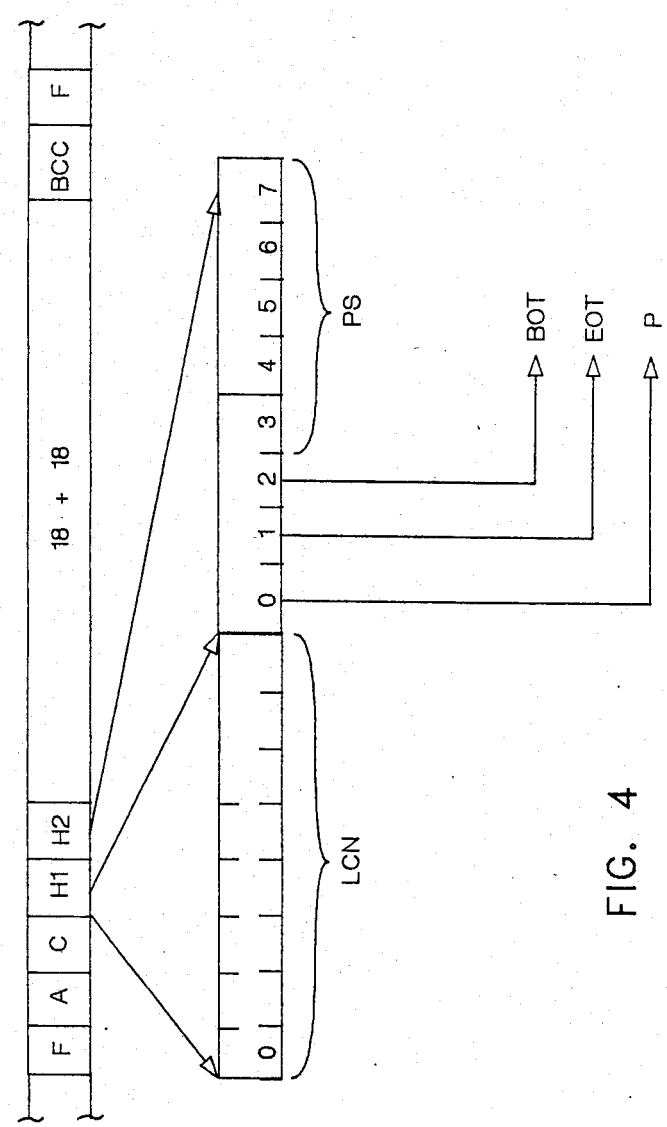
FIG. 4 shows the format of a packet of bits.

FIG. 4 illustrates the format of the packets of bits used in the VTEs at the transmitting end of the network. Fields F, A, C, BCC and F are as defined in the SDLC discipline (for further details, reference should be made to ISO Standard IS 3309). The F fields contain 8-bit flag bytes of the type "01111110" ("7E" in hexadecimal notation). The second field, A, contains a byte specifying the address of the VTE at the transmitting end. The third field, C, contains a byte that controls the direction in which the transmission is to be effected. Field BCC consists of two characters (bytes) used for transmission checking purposes. The packet further contains two headers, bytes H1 and H2. Byte H1 is used to guide the propagation of the packet through the network, between input and output VTEs. The contents of H1 includes a logic channel number (LCN) defining a channel between a GNE and an immediately following TNE or between two consecutive TNEs in the transmission path between two terminals. Thus, H1 is updated at successive points by means of a technique similar to that described in CCITT Recommendation X25. The second byte, H2, is more important from the standpoint of the present invention. The eight bit positions of H2 are numbered 0 to 7 in FIG. 4. Bit zero, designated P, is termed parity flag. Bit 1, designated EOT, is a flag identifying the end of a talkspurt. Bit 2, designated BOT, is a flag identifying the beginning of a talkspurt. Note that, for present purposes, the EOT and BOT bits are set to the ¢0" logic level to indicate the end or the beginning of a talkspurt. Bits 3 to 7, designated PS, define each packet's sequence number. This number allows the use of a modulo-32×40 ms counter to count the elapsed time. The data bits form two groups of eighteen bytes each, representing a total of two 20-ms segments of voice signal. The parity bit alternates between the "1" and "0" logic levels to indicate a long pause, and remains unchanged in the case of a short pause (<1.28 s).

The contents of field PS are forced to zero at the end of a long pause, that is, when bit P changes value, and are then increased by unity every 40 ms, regardless of whether a packet is transmitted or not. For present purposes, field PS has been limited to five bits, which allows a modulo-32 counting function (32 being expressed in decimal). Although this field length is not limitative, it is considered sufficient to enable a precise measurement of short pauses since 32×40 ms=1.28 s.

Figure 5:
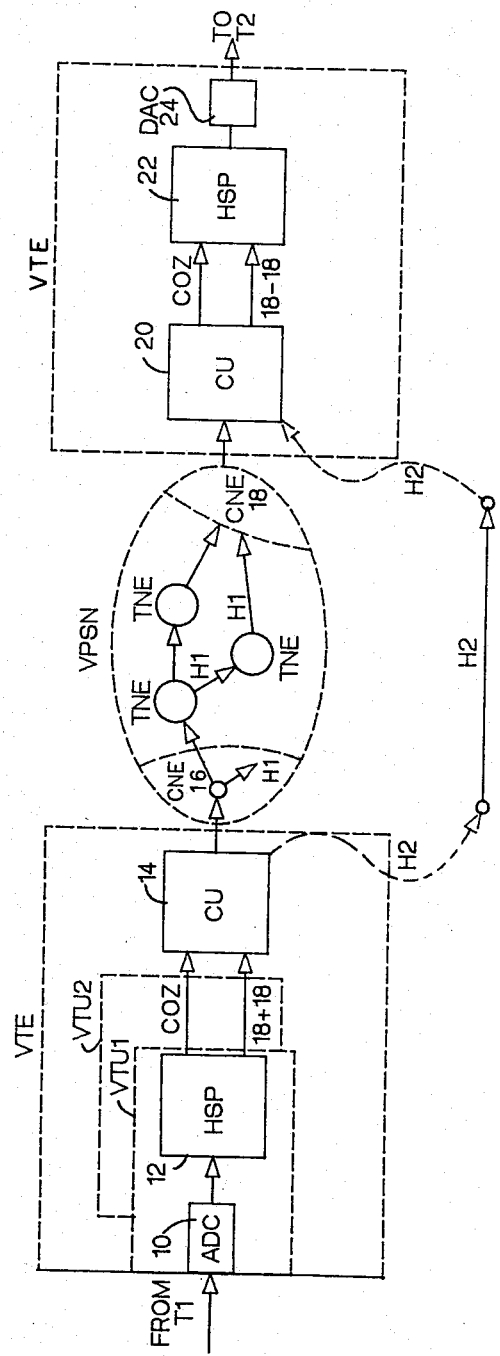
FIG. 5 is a schematic diagram of the communication network between two telephone sets T1 and T2.

FIG. 5 is a schematic drawing of the transmission path between telephone sets T1 and T2 to illustrate the various operations that involve the header bytes. The voice signals generated by the subscriber at T1 are converted to digital form by a PCM coder 10 which filters the signals to fit the telephone bandwidth (300 to 3200 Hz, for example), samples the signals at 8 KHz and codes the samples in PCM, using twelve bits per sample. The coded signals are then compressed by a device (HSP) 12 which processes the successive samples in blocks each representing a 20 ms voice signal segment. A coder of the type described in the U.S. Patent mentioned earlier may be used for the purposes of this compression. The coder uses BCPCM techniques as applied to a sub-band coding process with dynamic distribution of the quantizing bits. This type of coding is also called VEPC for Voice Excited Predictive Coding. Compressor 12 supplies eighteen data bytes per 20-ms voice signal segment, as well as complementary information termed communication zone (COZ), which includes information relating to the voice activity detection (VAD) function. This function can be performed by means of the activity detector mentioned earlier (not shown). This device distinguishes the talkspurts from the pauses and generates a so-called activity bit to represent such conditions. When the logic level of this bit, which is included in the complementary information (COZ), denotes a lack of voice activity, that is, a pause, the corresponding packet remains in principle within the VTE. As will later be seen, the actual operations involved are slightly more complex than those just described. Devices 10 and 12 are the main components of a VTU.

As previously mentioned, each packet contains data representing two 20-ms voice signal segments supplied by signal compressor 12. Functionally, each packet may be formed within a VTE by a control unit or device (CU) 14. Device 14 assembles headers H1 and H2 before sending a packet to a network input node 16. In principle, any packets representing pure silence periods, whether short or long pauses are involved, should not be sent to the input node. More precisely, unit 14 arranges the segments coded by compressor 12 in pairs and examines the activity bits in each pair. Each pair of bits can assume four values, namely, 00, 01, 10 or 11. In principle, packets corresponding to a pair 00 are not sent to input node 16, but packets associated with a pair 01, 10 or 11 are transmitted. As will be seen later on, what happens in actual practice is somewhat more complex. The voice packet switching network schematically shown in FIG. 5 includes several transit nodes and several possible transmission paths between network input node (GNE) 16 and network output node (GNE) 18. As previously mentioned, the actual path to be followed by packets leaving input node (GNE) 16 is determined at the time the connection between T1 and T2 is established and, in the present instance, remains unchanged during a given telephone call. However, an alternative solution would consist in using a central control unit (not shown) to manage the network. The packets destined for T2 leave network VPSN via output node (GNE) 18 and are sent to a VTE assigned to T2 for the purpose of the current telephone call. A control unit (CU) 20 processes each packet to remove therefrom the 2×18 data bytes and the complementary information (COZ) to be defined later. Suffice it to say at this stage that in addition to supplying the data obtained by compressing the 20-ms voice signal segments, control unit 20 must generate information allowing, in particular, the pauses to be reconstructed in a receiving decoder or synthesizer 22 which uses the principles described in previously mentioned U.S. Pat. No. 4,216,354. A digital-to-analog converter 24 at the output of synthesizer 22 reconstructs the analog signal to be delivered to telephone set T2.

Figure 6:
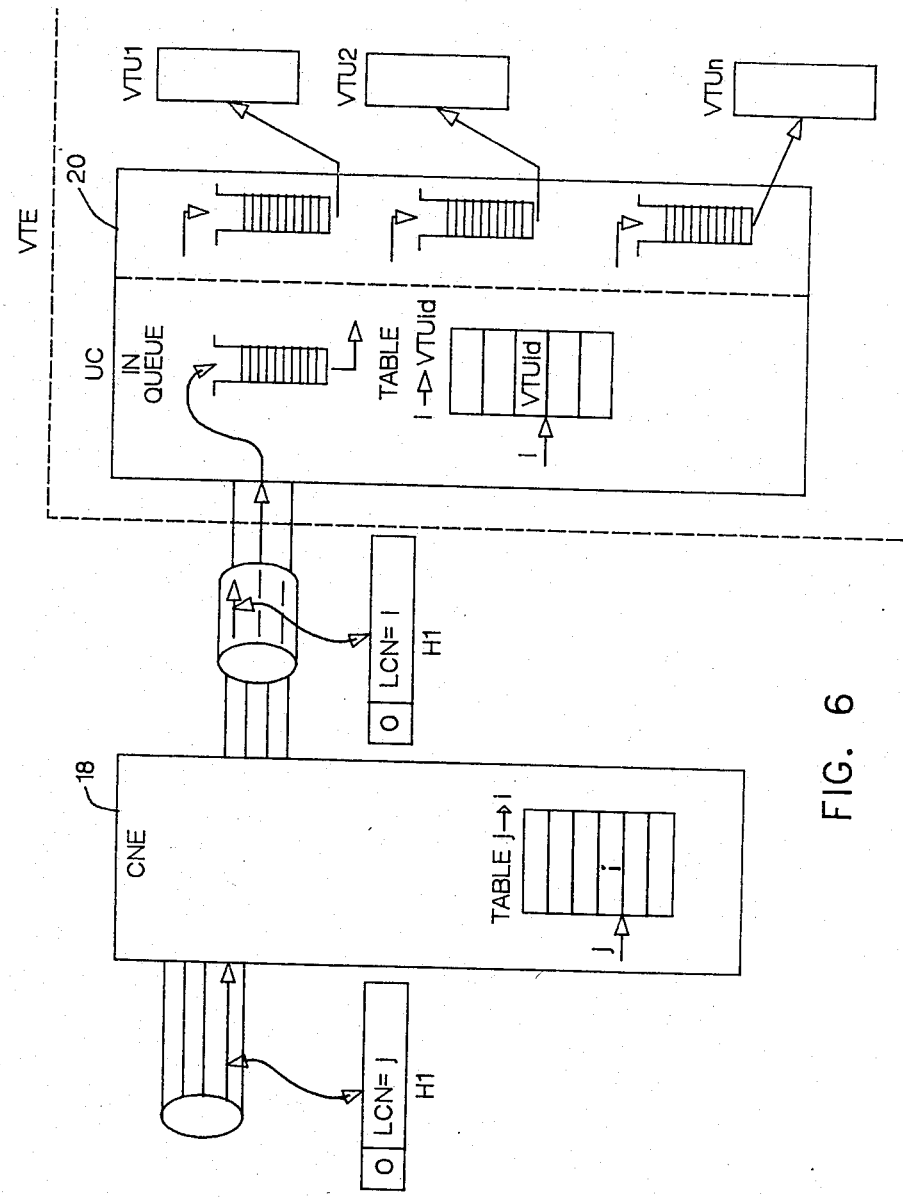
FIG. 6 is a schematic diagram illustrating enqueuing operations performed through the network.

Some of the packets transmitted between T1 and T2 may go astray or, which amounts to the same thing, may be altered to such an extent that they cannot be accepted by control unit 20. All such packets can therefore be considered lost. Lost packets will be reconstructed by using, in particular, the means described in European patent application No. 83430035.2 filed Oct. 28, 1983, performing interpolation/extrapolation operations under the control of unit (UC) 20. The loss of some packets renders even more critical the effects of fluctuations of the rate at which packets are received by control unit 20 in the VTE assigned to telephone terminal T2. Before describing the means used herein to overcome the effects of such fluctuations, the operations performed to place the packets on successive queues between output node (GNE) 18 and the voice terminal unit (VTU) serving T2 will be described with reference to FIG. 6.

Assume that the packet presented to output node 18 includes a header H1 containing a logic channel number LCN=j. Value j serves to address in node 18 a conversion table for converting j to i. Accordingly, header H1 is modified such that LCN×i in the packet leaving node 18, to allow that packet to be sent to the appropriate VTE. The packet is then placed on a receiving queue termed IN QUEUE in the VTE. Packets leaving the IN QUEUE are collected at a rate defined by control unit (CU) 20 for transmission to the VTU specified by index "i" in header H1. The VTU concerned is determined by reference to a table TABLE (i→VTUid), in control unit 20. The packet received by the VTE is placed on a queue pending transmission to the decoder (VTU) that will reconstruct the voice signal to be fed to telephone terminal T2.

Just as the outgoing voice signal from T1 was processed, that is, encoded in a synchronous manner in 20-ms segments which were then assembled to form packets each comprising two segments, so also the incoming signal must be decoded synchronously at the receiving end. However, fluctuations of the times at which incoming packets are placed on the VTU queue, and which are themselves due to variations of the transmission delay "d" (see FIG. 2), can affect the synchronous transmission to the VTU decoder of the voice bits contained in the packets. This happens when there are no packets left in the VTU queue because of variations of "d". Although suitable methods of reconstructing lost packets are used herein, it will be readily apparent that the number of lost packets should be reduced to a minimum to ensure a proper reconstruction of the voice signal presented to T2.

In order to compensate for variations of the above transmission delay, the packets are retained for a specific time interval "R" before the decoding of the voice signal begins in the VTU. The value of retention period "R" can be determined in a number of ways. So far as possible, one should ensure that $R \leq d$ max, the value of d max being itself determined as a function of the maximum possible time interval required for the data to travel between T1 and T2. For example, the value of "R" could be determined as a function of the traffic or of the transmission path. Where the number of transit nodes assigned to a given connection between nodes GNE is variable, the value of "R" should be set as a function of the number of nodes through which the packets must pass and of their characteristics (that is, in particular, the maximum lengths of the queues). In this example, the value of "R" is set in a predetermined manner and is applicable to all VTEs in the network. The designer of the network calculates the worst-case value of dmax, that is, assuming the longest possible VTE-to-VTE path and the maximum volume of traffic, and sets the value of "R" to be used. While the VTE-to-VTE path includes a number of queues, the maximum length of every queue is well-defined in practice, so that the maximum waiting time in the queues associated with the longest path can be evaluated by the designer of a given network.

Figure 7:
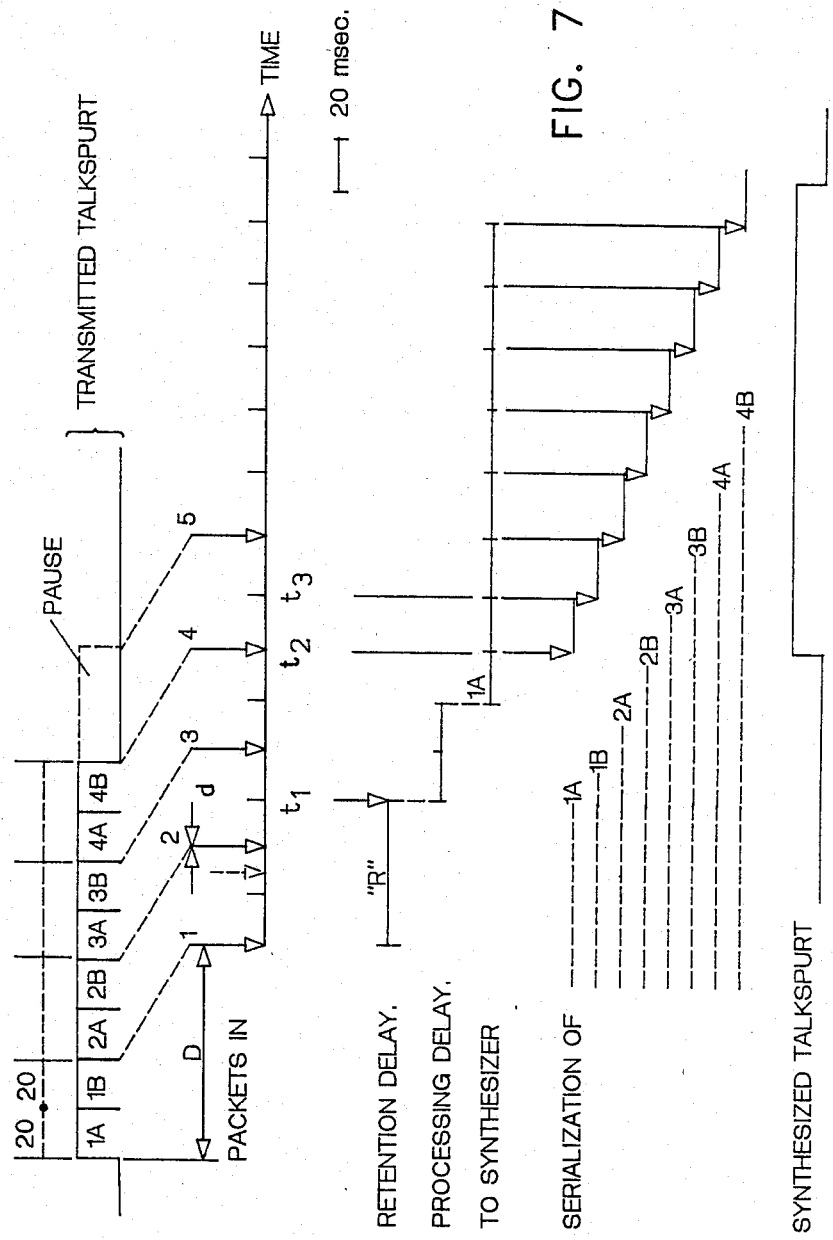
FIG. 7 illustrates the sequence of operations performed at the receiving end.

FIG. 7 is a timing diagram illustrating the sequence of operations described above. This figure is similar and complementary to FIG. 3. The same talkspurt as before is transmitted, but now includes the two 20-ms segments shown after the end of the talkspurt and at the beginning of a pause detected by the activity detector. The purpose of this is to explain why a fifth packet is transmitted (see FIG. 3) whereas the particular talkspurt under consideration should only comprise four packets.

Packets numbered 1 to 5 reach control unit 20 after a time interval "D" to which delay "d" may be added as necessary, and will only be supplied to the synthesizer in the VTU assigned to T2 after retention delay "R" has expired. In this example, "R" has been set at 80 ms. Thus, the data bits in blocks 1A and 1B of the first talkspurt will only be supplied to the decoder of the receiving VTU associated with T2, 60 ms after reaching the VTU. This delay may be increased by the time required for processing the received packets, particularly within control unit 20. The data bits from segments 1A, 1B, etc., are then serialized. The decoding and the synthesis of the voice signal at synthesizer 22 actually begin at time t2, after synthesizer 22 has received the block of eighteen data bytes representing signal segment 1A.

As mentioned in connection with FIG. 5, the voice terminal unit (VTU) 10, 12 systematically encodes the signal from telephone set T1 and provides control unit 14 with eighteen data bits per 20-ms portion of said signal together with so-called complementary information (COZ). Control unit 14 uses such complementary information to define the values that bits BOT and EOT in the packet being processed are to assume, and to decide whether the packet should be sent to the input node equipment. This decision is also dependent on a similar decision made by control unit 20 with respect to the previously processed 20-ms segment(s). The decisions are made in accordance with Table I below:

TABLE I

| VAD | | | | TRANSMIT | | | |
|---|---|---|---|---|---|---|---|
| Segment A | Segment B | Preceding Segment | STATE Previous | Decision | EOT Bit | BOT Bit | Meaning |
| VAD=0 | VAD=0 | VAD=0 | No | No | | | Pause |
| VAD=0 | VAD=1 | VAD=0 | No | Yes | 1 | 0 | Beginning of talkspurt |
| VAD=0 | VAD=1 | VAD=1 | No | No | | | * |
| VAD=1 | VAD=0 | VAD=1 | No | No | | | * |
| VAD=1 | VAD=1 | VAD=1 | No | No | | | * |
| VAD=1 | VAD=0 | VAD=0 | No | No | | | Single-segment talkspurt |
| VAD=1 | VAD=1 | VAD=0 | No | Yes | 1 | 0 | Beginning of talkspurt |
| VAD=0 | VAD=0 | VAD=1 | No | No | | | * |
| VAD=0 | VAD=0 | VAD=0 | Yes | No | | | Beginning of pause |
| VAD=0 | VAD=1 | VAD=0 | Yes | Yes | 1 | 0 | Beginning of talkspurt |
| VAD=0 | VAD=1 | VAD=1 | Yes | Yes | 1 | 1 | Middle of talkspurt |
| VAD=1 | VAD=0 | VAD=1 | Yes | Yes | 0 | 1 | End of talkspurt |
| VAD=1 | VAD=0 | VAD=0 | Yes | No | | | Single-segment talkspurt |
| VAD=1 | VAD=1 | VAD=1 | Yes | Yes | 1 | 1 | Middle of talkspurt |
| VAD=1 | VAD=1 | VAD=0 | Yes | Yes | 1 | 0 | Beginning of talkspurt |
| VAD=0 | VAD=0 | VAD=1 | Yes | Yes | 0 | 1 | End of talkspurt |

*This condition cannot occur.

Notes:
(1) BOT or EOT = 0 denotes the beginning or the end of a talkspur, respectively.
(2) The bottom line of the Table confirms that, as previously mentioned, an additional packet must sometimes be formed to transmit the "end of talkspurt" information, even though a pause may be detected by the activity detector.
(3) When one isolated talkspurt segment is detected between two pauses, it is assumed that the segment represents noise and the packet in which it should be included is not sent to the output of the VTE in which said packet was assembled.

Control unit 14 uses the logic information shown in Table I to form two 20-ms talkspurt segments within the same packet and to assemble the packet, in particular, by giving a value to the BOT and EOT bits.

Figure 8:
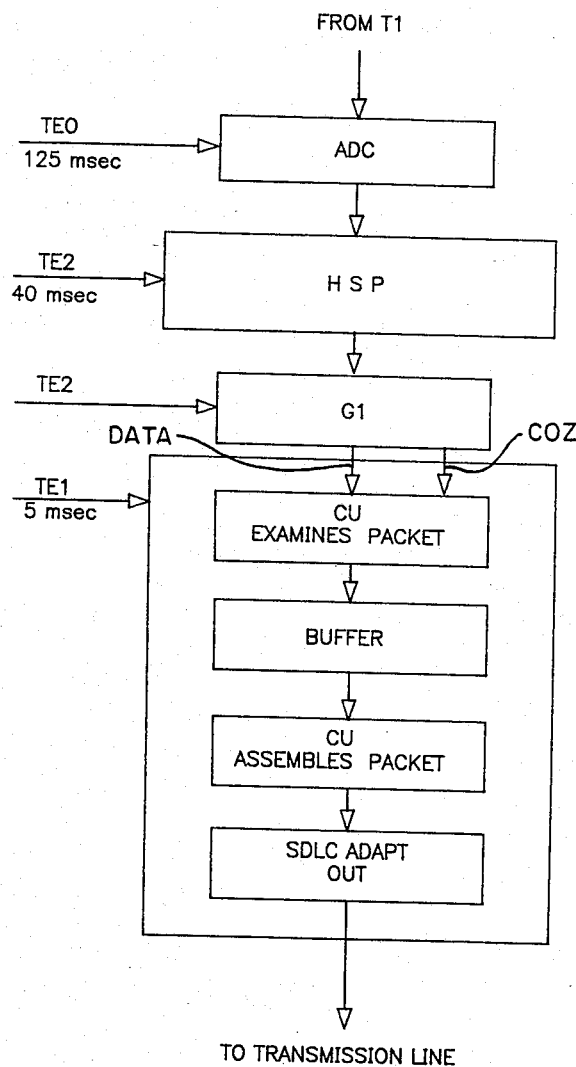
FIGS. 8 and 9 illustrate signal processing steps performed during transmit and receive operations.

FIG. 8 illustrates the sequence of operations performed within the VTE associated with telephone T1 at the transmitting end. Every 125 μs (at times TE0), the signal from T1 (whether voice, ambient noise or a silence is involved) is sampled and converted to digital form using PCM with 12 bits per sample (analog-to-digital conversion or ADC). The samples are sequentially fed to coder/compressor (HSP) 12, whose functions are in fact performed by a microprocessor. This microprocessor processes the incoming samples in blocks representing each successive 20-ms segments of coded signal to enhance the coding or to compress the coded data by means of the techniques described in aforementioned U.S. Pat. No. 4,216,354. The data so processed are fed every 40 ms, at times TE2, to control unit (CU) 14. This is schematically shown as taking place through a gate G1. Note that the data and the complementary information (COZ) are shown as being provided separately. If it is assumed that eight VTUs within a given VTE are controlled by the same control unit 14, then the VTUs should be scanned every 5 ms so that any one VTU would be scanned every 40 ms. In addition to the bits of the coded signal, microprocessor 12, which performs the previously mentioned signal coding and compressing functions, supplies the voice activity data (VAD) serving to define the EOT and BOT bits. After analyzing the data received from microprocessor HSP, control unit 14 causes the blocks of 2×18 data bytes to be buffered and performs the operations necessary to assemble a packet of bits. Briefly, control unit 14 determines the logic levels of the EOT and BOT bits to form header H2, and changes the logic level of parity bit P (see FIG. 4) depending on whether the packet being processed follows a long pause or not. (Note that, at the receiving end, in the VTE containing control unit (CU) 20 associated with telephone terminal T2, the storage location in which parity bit P is to be stored is initially set to the "1" level so that the first talkspurt of a given telephone conversation can be identified by comparing the logic level of the incoming bit P with the contents of said storage location). Control unit 14 further determines the contents of field PS defining the packet's sequence number. The bits therein are automatically reset to the "0" level subsequent to a long pause, i.e. after a change in the logic level of parity bit P. The value of said number is increased by unity every 40 ms, whether the packet is transmitted or not. As stated earlier, the fact that field PS is limited to five bit positions in this example allows a modulo-32 packet counting function. This allows precise measurements of short ($\leq 1.28$ sec) pauses, which is one of the objects to be attained.

As the first packet of bits of a given talkspurt is assembled, bit BOT is set to the "0" logic level to indicate the beginning of the talkspurt and enable the loss of that packet to be detected at the receiving end.

Next, the SDLC ADAPT OUT function is performed to conventionally arrange the data in a SDLC-type format, filling in particular fields F, A, C and BCC and, as the case may be, adding stuffing or zero-insertion bits to the message to achieve a transparent transmission. The SDLC adapter then sends the assembled packet over the transmission line to network input node (GNE) 16. This may be done through a modem such as the IBM 3865 Modem.

Figure 9:
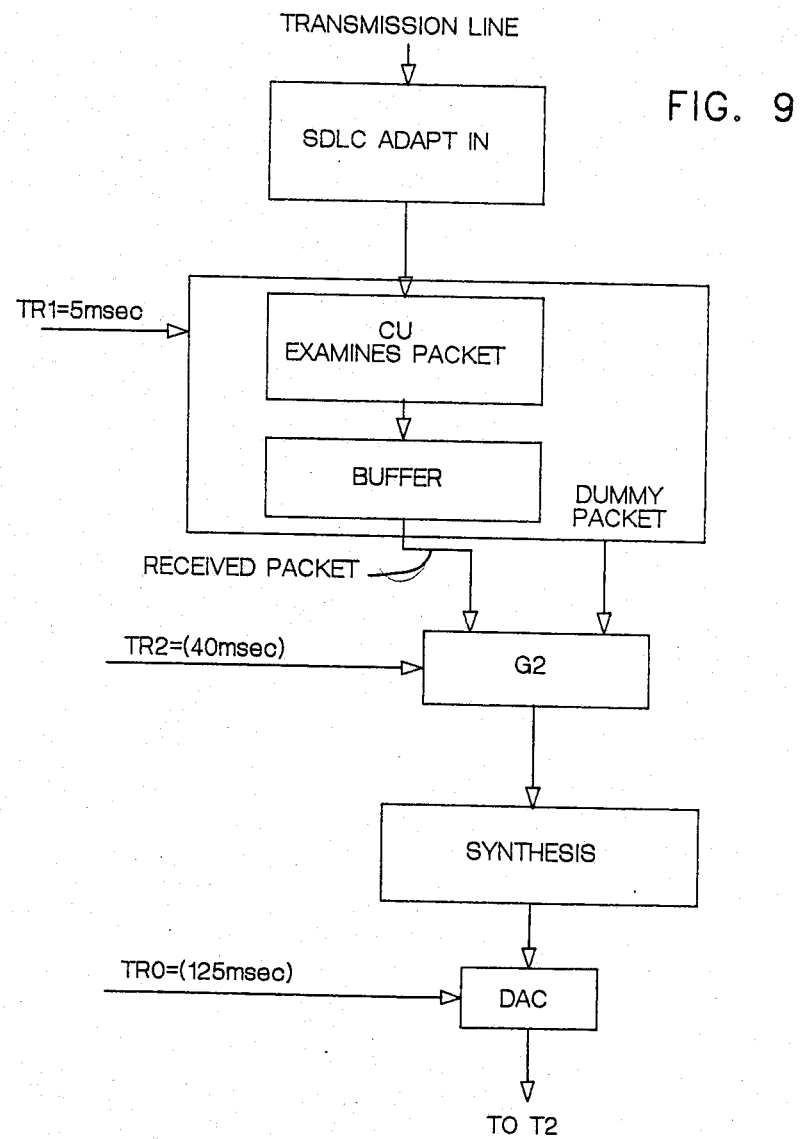

FIG. 9 is a schematic illustration of the operations carried out at the receiving end, that is, beyond output node (GNE) 18. Note that, at the receiving end as well as at the transmitting end, control unit (CU) 20 manages eight VTUs, hence eight decoding and decompression devices (HSP) 22, although a single VTU is described herein. After the signal is demodulated by a modem (not shown), control unit 20 is provided with packets of bits in the format shown in FIG. 4. These packets are stored in an adapter (SDLC ADAPT IN) as they are received and are then analyzed, and, as the case may be, buffered, before being processed, as will later be seen.

Of more immediate interest is the fact that the BCC block of characters in the received packet is analyzed to check the validity of the data. If a negative result is obtained, then the packet is rejected. Control unit 20 may record this rejection as a means of facilitating the subsequent reconstruction of lost packets of bits.

If a positive result is obtained, then control unit 20 analyzes headers H1 and H2 and determines therefrom the operations to be performed.

The analysis of H1 yields the value of the logic channel number (LCN) that serves to identify the VTU for which the packet being processed is destined, hence a destination queue.

Header H2 is next analyzed, beginning with parity bit P. This bit is used to detect transitions between successive talkspurts at the receiving end, even though some packets may have been lost in transit. Bit P can also serve, if desired, to resynchronize the clocks (not shown) in the VTEs at the transmitting and receiving ends. In practice, however, the transmit and receive operations may be asynchronous.

Control unit (CU) 20 next analyzes the BOT and EOT bits to define the complementary information (COZ, not shown in FIG. 9) to be sent to decoder/synthesizer (HSP) 22. Such information is used by device 22 to determine the manner in which the incoming two 18-byte blocks are to be processed. The interpretation of the BOT and EOT bits is carried out in accordance with the logic defined in Table II below.

TABLE II

| BOT | EOT | PREVIOUS CONDITION | TYPE OF PACKET TO BE SENT TO HSP | MEANING TO CONTROL UNIT 20 |
|---|---|---|---|---|
| 0 | 0 | Pause | Received | Talkspurt comprising a single 20 ms signal segment |
| 0 | 1 | Pause | Received | Two 20-ms segments representing the beginning of a talkspurt |
| 1 | 1 | Voice | Received | Two 20-ms segments representing the middle of a talkspurt |
| 1 | 0 | Voice | Received | Two 20-ms segments representing the end of a talkspurt |
| 0 | 0 | Voice | Received | Single 20-ms segment representing the end of a talkspurt |
|   |   | Pause | Dummy | Pause to be synthesized |
|   |   | Missing packet | Dummy | Extrapolate or interpolate |

Lastly, control unit 20 analyzes field PS of the received packet to detect any lost packets or any packets rejected by the network, and also to reconstruct, in a relatively accurate manner, short pauses.

The received packets of bits are then stored in the buffer of the VTU for which the packet being processed is destined. This buffer serves to form the queue associated with the VTU. Every 40 ms (at times TR2), it is as if a gate G2 were activated, thereby allowing either a voice packet, called "received" packet, or a dummy packet to reach the decoder/synthesizer. The synthesizer uses "received" packets to decode and reconstruct the voice signal. Upon receiving a dummy packet (prestored in the control unit), the synthesizer either provides simulated ambient noise to "fill" the pause or reconstructs a lost voice packet by means of an extrapolation or interpolation process, using packets adjacent to the lost packet, following which the reconstructed packet will be decoded.

The signal is then decompressed and synthesized by HSP device 22. Finally, a digital-to-analog converter (DAC) 24 performs a BCPCM-to-PCM conversion, with PCM using twelve bits per sample, at the rate of 8,000 samples per second, and then converts the PCM signal back into an analog signal to be presented to destination telephone set T2.

Figure 10:
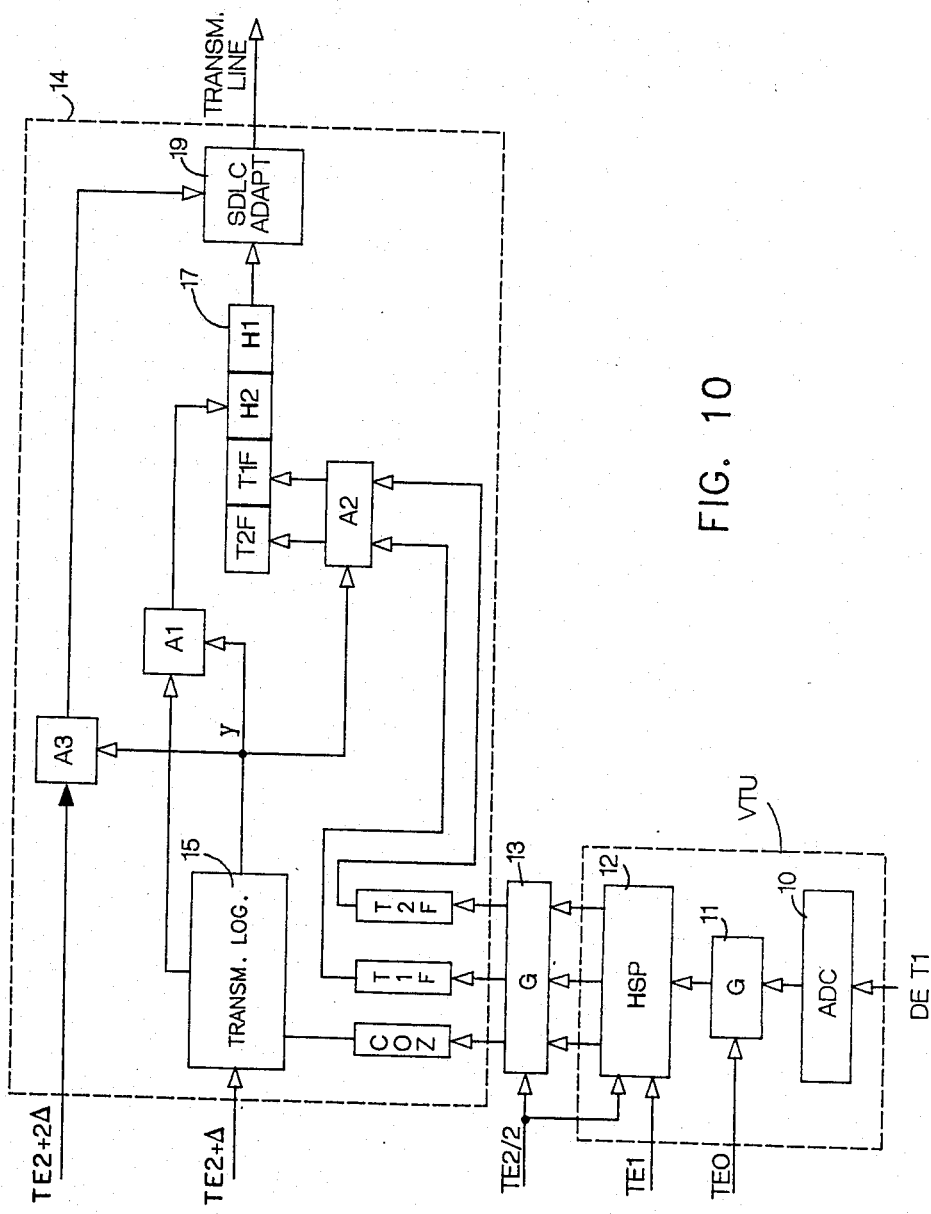
FIGS. 10 and 11 are schematic diagrams of certain components of a transmitter in accordance with the invention.

FIG. 10 is a block diagram of the transmitting end of a VTE showing the components which perform the operations described above. Note the presence of the three types of clock pulses used in FIG. 8, namely, TE0, TE1 and TE2. These pulses are supplied by clocks (not shown) every 125 $\mu$s, 5 ms and 40 ms, respectively.

The signal from telephone T1 is converted to digital form (using PCM with twelve bits per sample and sampling the signals at 8 KHz) in converter 10. The coded samples are then fed to compression device (HSP) 12 through a gate (G) 11 which opens whenever a TE0 pulse is applied thereto. Device 12 performs the subband coding operations described in aforementioned U.S. Pat. No. 4,216,354. In other words, device 12 transcodes the voice signal, using BCPCM techniques and processing the incoming data in blocks of samples each representing a 20-ms portion of the original voice signal. As has been seen, the device of the present invention is designed to group two consecutive blocks of 20 ms each, so that coder 12 provides every 20 ms, at times TE2/2 and through a gate 13, a block of bits to be inserted in the packet to be transmitted. Two 18-byte buffer registers, T1F and T2F, are provided to store the two blocks of data to be transmitted. Similarly, a register labeled COZ is provided to store the complementary information (COZ) previously mentioned. Also note that device 12 is synchronized by the clock that generates a TE1 pulse every 5 ms. This permits synchronizing the voice compressing devices in the eight VTUs attached to the single control unit (CU) 14 within the same VTE.

The information contained in register COZ serves to control the logic operations performed at the transmitting end by means of a logic device 15, called transmit logic (TRANSM. LOG.), which assembles header H2 and transfers H2 to a register 17 through a gate A1. Similarly, the 36 bytes in T1F and T2F are transferred to register 17 through a gate A2. Gates A1 and A2 are activated under the control of logic device 15. Device 15 is itself controlled by timing pulses labeled TE2+$\Delta$, with "+$\Delta$" indicating that these pulses are delayed by 5 ms with respect to timing pulses TE2.

Register 17 has an additional position for header H1 which, in this example, is fixed and loaded at the time network VPSN is initialized.

The contents of register 17 are transferred to an adapter (SDLC ADAPT) 19 controlled through a gate A3 by timing pulses delayed by 2×5 ms×10 ms with respect to pulses TE2. Adapter 19 completes the packet to be transmitted by adding thereto characters F, A, C, BCC and stuffing bits. Gates A1, A2, A3 are enabled when a signal labeled "Y" from logic device 15 goes to the "1" logic level to thereby confirm that the packet being assembled is to be transmitted.

Figure 11:
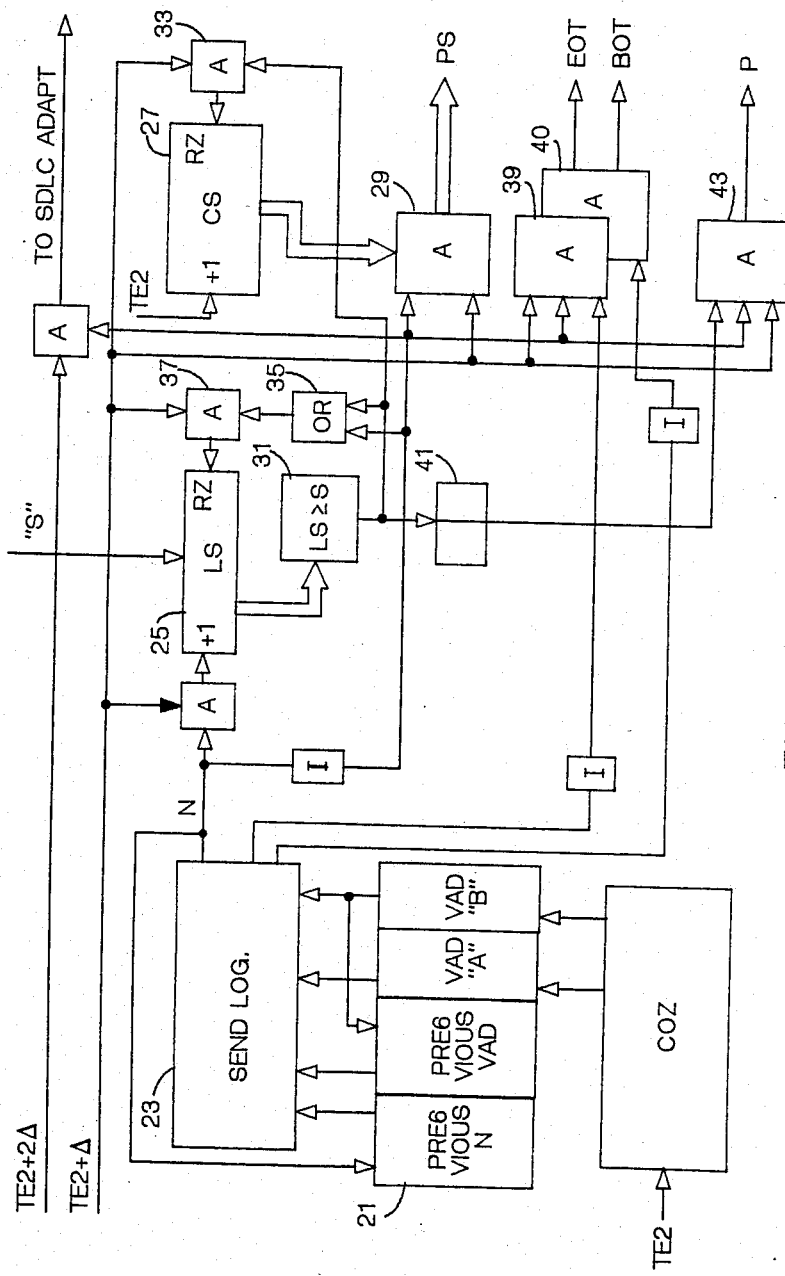

FIG. 11 illustrates an embodiment of logic device 15. This device performs, among other things, the operations summarized in Table I. To this end, the logic states of the activity detectors (VAD) as indicated in the complementary information (COZ) are stored in a buffer 21. Buffer 21 stores the activity indication (VAD) corresponding to three talkspurt segments, namely, the segments A and B being processed and the last preceding segment, that is, segment B of the preceding packet. These indications are fed to a logic circuit (SEND LOG) 23, which performs the logic functions shown in Table I and, in particular, indicates a send condition on a line N, if the packet being processed is to be transmitted. Line N goes to the "1" logic level to denote a negative or "No" indication. This level is inverted by an inverter (I) to denote a positive or "yes" indication. When a "1" logic level is present on line N at times defined by pulses TE2+$\Delta$, the contents of a long-pause counter (LS) 25 is increased by unity. Thus, this counter measures the silence periods. Another counter (CS) 27 is used to calculate the value to be assumed by field PS of a packet of bits in the process of being assembled. Counter 27 is a modulo-32 counter whose contents are increased by unity every 40 ms, whether a packet is transmitted or not. When a decision to transmit a packet is made by logic device 23, the contents of counter 27 are transferred at times TE2+$\Delta$ through a gate (A) 29 to field PS of header H2 in register 17 (see FIG. 9). The contents of counter 25 are compared with a threshold value S=32. When this value is reached, a comparator 31 supplies a "1" logic level which resets counter 27 to zero (RZ) through a gate (A) 33 at times TE2+$\Delta$.

When the output from comparator 31 or the inverted output N from logic device 23 goes to the "1" level, counter 25 is reset to zero at times TE2+$\Delta$. This takes place through an OR logic circuit 35 and a logic gate (A) 37.

The logic values of fields EOT and BOT in header H2 of the packet of bits being assembled are supplied by logic device 23 in accordance with Table I. These values are transferred to header H2 in register 17 through gates 39 and 40 which are activated at times TE2+$\Delta$, only if a packet is to be transmitted. As mentioned in relation to Table I, the "0" logic level denotes either the beginning or the end of a talkspurt, hence the need to provide inverters (I) at the inputs and outputs of gates 39 and 40.

Lastly, a bistable latch 41 is used to provide the contents of field P. This latch is forced to the "0" level when a telephone call is initiated. This logic level is then modified whenever the output from comparator 31 goes to the "1" level, indicating the end of a long pause. The output from latch 41 is transferred to field P in register 17 through a gate (A) 43 at times TE2+$\Delta$, if a packet is to be transmitted.

Figure 12:
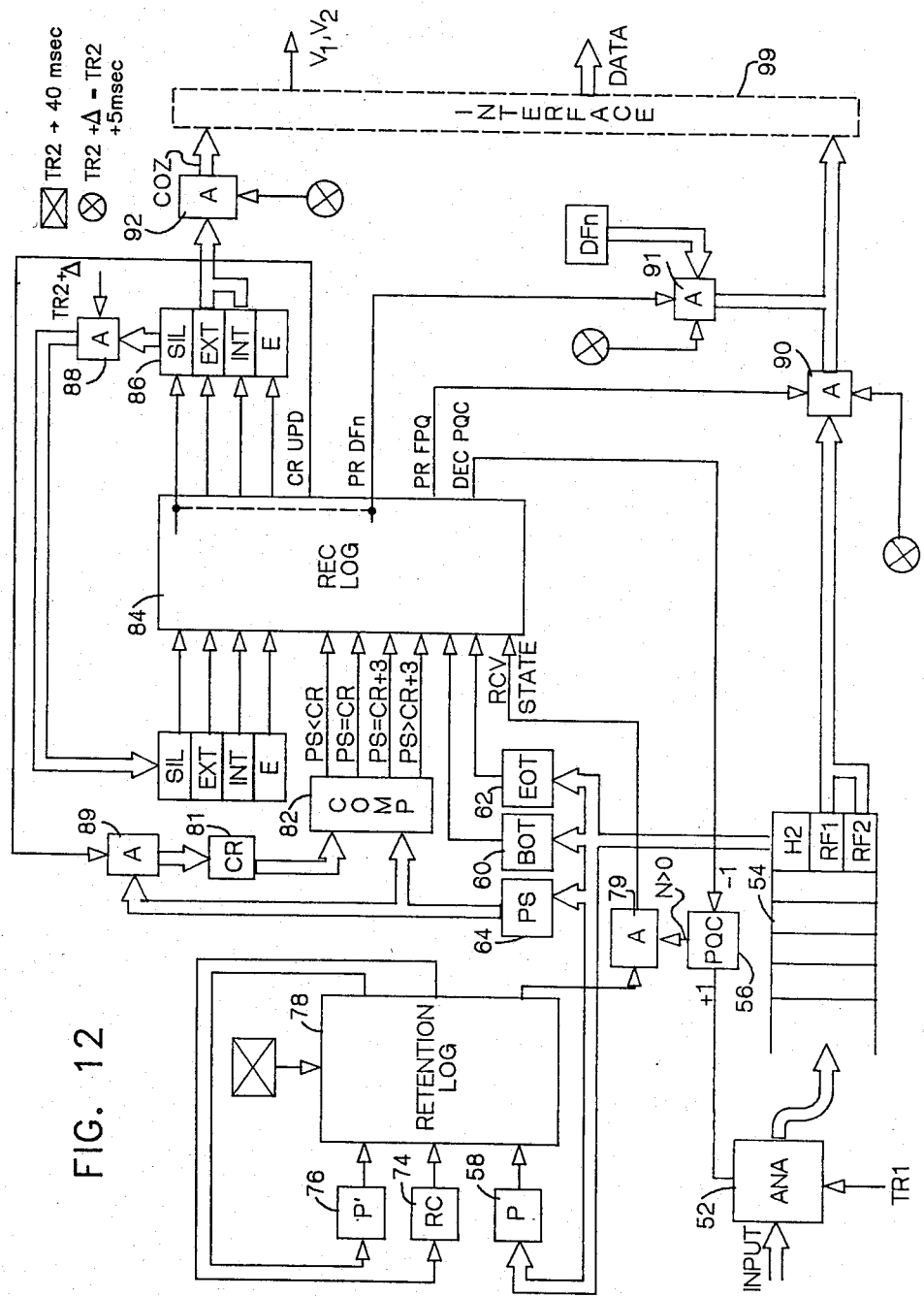
FIG. 12 is a schematic diagram of certain components of a receiver in accordance with the invention.

FIG. 12 is a block diagram of an embodiment of the receiver associated with telephone set T2 and illustrates the receiving end (excluding any modem which might be used) of the VTE to which the VTU serving T2 is attached. The components shown in FIG. 12 pertain to control unit (CU) 20 of FIG. 5 and perform, in particular, the functions shown in block form between SDLC ADAPT IN and SYNTHESIS in FIG. 9.

The line from input node 18 goes to SDLC adapter circuit (SDLC ADAPT) 50 of FIG. 9 (not shown in FIG. 12). The validity of each incoming packet is checked by means of the two BCC bytes. If any parity error is detected, then the packet is rejected; otherwise, information items such as F, A, C, BCC and the stuffing bits are removed from the packet, leaving in each packet headers H1 and H2 as well as 36 data bytes. These 36 bytes comprise two 18-byte blocks of bits, R1F and R2F, each representing a 20-ms talkspurt segment. R1F and R2F correspond to transmitted blocks T1F and T2F, which may or may not have been altered during transmission. Blocks R1F and R2F and headers H1 and H2 not rejected by the SDLC adapter are fed to the input of the FIG. 12 device.

A logic device (ANA) 52 examines the contents of header H1 to identify, after looking up Table i→VTUid (see FIG. 6), the destination VTU. H1 is then deleted and the contents of H2, R1F and R2F are stored in buffer 54, which contains the queue associated with said VTU.

The logic unit 52 in a given VTE manages the operation of eight VTUs and is controlled, in particular, by a clock TR1 (not shown), called receive clock, which generates a pulse every 5 ms. Whenever a packet (R1F, R2F, H2) is stored in buffer 54, the contents of a counter (PQC) 56, which counts the packets in a queue, is increased by unity. Every 40 ms, under control of the pulses generated by a clock TR2 (not shown), the contents of header H2 in the packet nearest the exit of the queue is examined. Bits P, BOT and EOT are respectively stored in storage cells 58, 60 and 62, while the five bits of field PS are stored in a register 64. A retention counter (RC) 74 and a storage cell (P') 76 are also provided. During processing of a given packet, storage cell 76 is loaded with the value of the parity bit P associated with the processing of the preceding packet. The function of counter 74 will be explained later. The contents of counter 74 and storage cells 58 and 76 are fed to the input of a logic device 78 called retention logic (RETENTION LOG), which determines:

the logic level of parity bit P';
a value to be loaded in retention counter RC; and
the logic level of a line called presentation state (PRES. STATE) line.

The PRESS. STATE output from logic retention device 78 is applied to a gate (A) 79 whose function will be described later.

Device 78 performs the logic functions shown in Table III below.

TABLE III

| INPUT | | | OUTPUT | | | |
|---|---|---|---|---|---|---|
| P | P' | RC | PRES.STATE | RC | P' | COMMENTS |
| 0 | 0 | 0 | 1 | 0 | P' | |
| 0 | 0 | ≠0 | 0 | RC=RC-1 | P' | |
| 1 | 1 | 0 | 1 | 0 | P' | |
| 1 | 1 | ≠0 | 0 | RC=RC-1 | P' | |
| 0 | 1 | 0 | 0 | R | P | |
| 0 | 1 | ≠0 | 0 | RC=RC-1 | P' | Error condition =abnormal case |
| 1 | 0 | 0 | 0 | R | P | |
| 1 | 0 | ≠0 | 0 | RC=RC-1 | P' | Error condition =abnormal case |

Notes:
(1) ≠ 0 means different from zero
(2) In the embodiment described here by way of example, R = 2. In other words, the selected value of the retention interval is 2 × 40 = 80 ms.

When PRES. STATE="1", the retention counter has a zero count. The examination of the incoming packets may now begin. The contents of a counter (CR) 81, termed reception counter, are forced to zero.

The contents of register (PS) 64 and of counter 81 are compared in a comparator (COMP) 82, which has four output lines. Only one of these can be activated as a result of the comparison.

The logic levels of the output lines of comparator 82 are shown in Table IV below.

TABLE IV

| PS§CR | PS=CR | PS=CR+1 | PS CR+1 |
|---|---|---|---|
| 1 | 0 | 0 | 0 |
| 0 | 1 | 0 | 0 |
| 0 | 0 | 1 | 0 |
| 0 | 0 | 0 | 1 |

A logic device 84 called receive logic (REC. LOG.) is connected to the output lines from comparator 82 and from storage cells 60 and 62 in which are stored the values of the BOT and EOT bits in header H2 of the packet being analyzed, which is the packet nearest the output of buffer 54. Logic device 84 uses said values of the BOT and EOT bits to generate a bit called extrapolation/interpolation bit, or "E" bit, in accordance with Table V below.

The four logic outputs from comparator 82 have the following meanings:

PS<CR: the packet being analyzed is not in proper sequence (inversion) or its transmission through the network exceeded the maximum time interval allowed (D+d).
PS=CR: the packet being analyzed can be reconstituted (in phase with receive clock CR).
PS=CR+1: the packet preceding the one being processed is missing.
PR>CR+1: several packets preceding the packet being processed are missing.

TABLE V

| BOT | EOT | E |
|---|---|---|
| 0 | 0 | 0 |
| 0 | 1 | 0 |
| 1 | 0 | 0 |
| 1 | 1 | 1 |

Gate (A) 79 is enabled when the count of counter PQC 56 is positive and output line PRES. STATE from retention logic 78 is at the "1" logic level. As previously mentioned, the count of counter 56 is increased by unity whenever a packet is enqueued in buffer 54, and decreased by unity whenever an information item is sent thereto over a line labeled DEC. PQC from receive logic device (REC. LOG.) 84.

The output from gate (A) 79 provides an information item termed receive state which is sent to logic device 84 over a line labeled REC. STATE. When this line is at the "0" logic level, device 84 makes the following decisions:

a control line called dummy packet presentation control line (labeled PR DFn) is caused to rise to the "1" logic level;
the logic level of an output line called silence line (SIL) from device 84 is forced to "1".
the logic levels of the other three output lines, respectively called extrapolation (EXT), interpolation (INT) and E lines, are forced to "0".

The logic levels of the SIL, EXT, INT and E lines are stored in an output buffer 86. At a time defined by TR2+Δ, 5 ms after the time defined by clock TR2, the contents of buffer 86 are transferred to an input buffer 87 through a gate (A) 88.

The valid combinations of logic levels present on the SIL, EXT, INT and E lines as well as the corresponding action to be taken by the device that synthesizes the signal to be delivered to T2 are summarized in Table VI below.

TABLE VI

| | SIL | EXT | INT | E | ACTION REQUIRED |
|---|---|---|---|---|---|
| (1) | 0 | 0 | 0 | 0 | 1. Synthesize received voice packet (on interface 99 of |
| (2) | 0 | 0 | 0 | 1 | 2. FIG. 12). |
| (3) | 0 | 1 | 0 | * | 3. Reconstruct a voice packet by extrapolation, using preceding voice packet. |
| (4) | 0 | 0 | 1 | 1 | 4. Reconstruct a voice packet by interpolation between the preceding packet and the packet received. |

TABLE VI-continued

| | SIL | EXT | INT | E | | ACTION REQUIRED |
|---|---|---|---|---|---|---|
| (5) | 1 | 0 | 0 | 0 | 5. | Generate a silence. |

*don't care

Logic device (REC. LOG) 84 has additional output lines. One of these, designated CR UPD or counter update, is used, assuming the existence of an abnormal situation, to update counter CR 81 through a gate (A) 89. When output line CR UPD is at the "1" level, the value of PS as stored in register 64 is substituted for the count of counter 81. Another output line from device 84, designated PR FPQ, controls the activation of a gate 90 at the output of buffer 54 and through which passes the packet to be fed to synthesizer HSP.

Previously mentioned output line PR DFn controls the activation of a gate 91 through which so-called dummy packets (DFn) can be fed to synthesizer HSP.

Another gate (A) 92 at the output of buffer 86 controls the transfer of data present on lines EXT and INT to synthesizer HSP. Such data form part of the previously mentioned complementary or communiation information (COZ).

Logic device (REC LOG) 84 additionally performs logic operations which are dependent on information supplied by comparator 82, in accordance with relations given in Tables VII to X below.

The principles of operation of the receiver used in the VTE may be summarized as follows. Logic device 82 compares the count of receive counter CR with the sequence number PS of the first packet in the queue. If an equality is found (see Table VIII) and if RCV STATE="1", then the packet is sent to synthesizer 22 through gate 90 at times TR2+Δ, these being 5 ms later than times TR2. Simultaneously, since DEC PQC="1", the count of counter 56 is decreased by unity. This applies regardless of the logic level of line SIL at the input of logic device 84. However, if the count of counter CR and PS fail to match, then the sequence number of the packet will not, in principle, be the expected number. The system will then be in a situation corresponding, in principle, either to a period of silence or to the loss of a packet. If the former, the logic device will send dummy packets (DFn) to the synthesizer, which will use them to generate a 20-ms segment of simulated ambient noise intended to "color" a period of silence. If the latter, lost packet reconstruction operations will be performed in accordance with European patent application No. 83430035.2 filed Oct. 28, 1983, wherein the reconstruction process sometimes involves extrapolation techniques which make use of the packet preceding the lost one, and sometimes calls for interpolation techniques based upon the contents of packets that both precede and follow the lost packet. In the device of the present invention, as earlier noted, an E bit

TABLE VII

| INPUT | | | | | PS<CR OUTPUT | | | | | | |
|---|---|---|---|---|---|---|---|---|---|---|---|
| SIL | EXT | INT | E | RCV STATE | SIL | EXT | INT | CR UPD | PR FPQ | PR Dfn | DECR PQC |
| 1 | * | * | * | 1 | 0 | 0 | 0 | 1 | 1 | 0 | 1 |
| 0 | 0 | 0 | 0 | 1 | 1 | 0 | 0 | 0 | 0 | 1 | 1 |
| 0 | 1 | 0 | * | 1 | 1 | 0 | 0 | 0 | 0 | 1 | 1 |
| 0 | 0 | 0 | 1 | 1 | 0 | 1 | 0 | 0 | 0 | 0 | 1 |

TABLE VIII

| INPUT | | | | | PS=CR OUTPUT | | | | | | |
|---|---|---|---|---|---|---|---|---|---|---|---|
| SIL | EXT | INT | E | RCV STATE | SIL | EXT | INT | CR UPD | PR FPQ | PR Dfn | DECR PQC |
| 1 | * | * | * | 1 | 0 | 0 | 0 | 0 | 1 | 0 | 1 |
| 0 | * | * | * | 1 | 0 | 0 | 0 | 0 | 1 | 0 | 1 |

TABLE IX

| INPUT | | | | | | | | PS=CR+1 OUTPUT | | | | | | |
|---|---|---|---|---|---|---|---|---|---|---|---|---|---|---|
| SIL | EXT | INT | E | BOT | EOT | RCV | SIL | EXT | INT | CR UPD | PR FPQ | PR Dfn | DECR PQC |
| 1 | * | * | * | * | * | 1 | 1 | 0 | 0 | 0 | 0 | 1 | 0 |
| 0 | * | * | 1 | 1 | 1 | 1 | 0 | 0 | 1 | 0 | 1 | 0 | 0 |
| 0 | * | * | 1 | 0 | 0 | 1 | 0 | 1 | 0 | 0 | 0 | 0 | 0 |
| 0 | * | * | 1 | 1 | 0 | 1 | 0 | 1 | 0 | 0 | 0 | 0 | 0 |
| 0 | * | * | 1 | 0 | 1 | 1 | 0 | 1 | 0 | 0 | 0 | 0 | 0 |
| 0 | * | * | 0 | * | * | 1 | 0 | 1 | 0 | 0 | 0 | 0 | 0 |
| 0 | 1 | 0 | * | * | * | 1 | 1 | 0 | 0 | 0 | 0 | 1 | 0 |

TABLE X

| INPUT | | | | | PS>CR+1 OUTPUT | | | | | | |
|---|---|---|---|---|---|---|---|---|---|---|---|
| SIL | EXT | INT | E | RCV STATE | SIL | EXT | INT | CR UPD | PR FPQ | PR Dfn | DECR PQC |
| 1 | * | * | * | 1 | 1 | 0 | 0 | 0 | 0 | 1 | 0 |
| 0 | * | * | 0 | 1 | 1 | 0 | 0 | 0 | 0 | 1 | 0 |
| 0 | 0 | * | 1 | 1 | 0 | 1 | 0 | 0 | 0 | 0 | 0 |
| 0 | 1 | * | * | 1 | 1 | 0 | 0 | 0 | 0 | 1 | 0 | is generated by using, in particular, the EOT and BOT bits and header H2. As will be seen, the E bit is used, in particular, to decide whether an interpolation or an extrapolation process is called for.

If PS=CR+1, the sequence is interrupted, resulting in the four possible situations discussed below:

1. Input line SIL="1" and RCV STATE="1"; a 20-ms pause is to be synthesized. In this case, output lines SIL and PR DFn go to the "1" logic level. Gate (A) 91 is activated to allow a dummy packet (DFn) to be transferred to synthesizer HSP. This packet of bits is used by the microprocessor/decoder (not shown) to synthesize an ambient noise.

2.1 Inputs E, BOT, EOT and RCV STATE are at the "1" level while input SIL="0". Outputs INT and PR FPQ rise to the "1" level. The packet available, that is, the first packet in the buffer 54 queue, should normally be processed during the next TR2 cycle, but will also be used during the current TR2 cycle to enable the lost packet to be reconstructed by interpolation between the packets that immediately precede and follow the lost packet. To this end, one may use the means described in the patent application entitled "Method of Reconstructing Lost Data in a Digital Voice Transmission System And Transmission System Using Said Method" filed by this applicant Oct. 28, 1983. Also note that DEC PQC="0" (see Table IX). This means that the packet being used is not removed from the queue and the the count of counter 56 remains unchanged.

2.2 Inputs E and RCV STATE are at the "1" level while input SIL="0" and BOT, EOT are not in configuration 11. The packet available, which is the leading packet in the buffer 54 queue, should normally be handled during the next TR2 cycle but will also be used during the current TR2 cycle to allow the lost packet to be reconstructed by extrapolating from the preceding packet. Output line EXT rises to the "1" level and all others drop to the "0" level. This may be done by using the means described in the patent application referred to in section 2.1 above. Also note that DEC PQC="0" (see Table IX). This means that the packet being used is not removed from the queue and that the contents of counter 56 remain unchanged.

3. Inputs SIL and E are both at the "0" level while input RCV STATE is at the "1" level. Output EXT rises to the "1" level. In this case, the lost packet is reconstructed by extrapolating from the preceding packet sent to the synthesizer. Thus, no packet is sent to the synthesizer through gates 90 and 91;

4. Inputs SIL and INT are both at the "0" level while inputs EXT and RCV STATE are both at the "1" level. Outputs SIL and PR DFn are both at the "1" level while all other outputs from device 84 are at the "0" level.

In this case, a noise segment is synthesized from the DFn packet sent to the synthesizer through gate 90.

If PS>CR+1, the sequence is interrupted, as in the previous case, but the situation is more critical than when PS=CR+1 because there are several lost packets. Four different cases are discussed below (see Table IX):

1. Inputs SIL and RCV STATE are both at the "1" logic level. The logic device generates SIL="1" and PR DFn="1". All other outputs from device 84 drop to the "0" logic level. A silence must be synthesized and a dummy packet DFn is sent through gate 91.

2. Inputs SIL and E are both at the "0" level while RCV STATE is at the "1" level. Outputs SIL and PR DFn from logic device 84 both rise to the "1" level and all other outputs drop to the "0" level. As above, a silence must be synthesized. Accordingly, a dummy packet DFn is sent through gate 91.

3. Inputs SIL and EXT are both at the "0" level while E and RCV STATE are both at the "1" level. A lost packet must be synthesized by means of an extrapolation. Accordingly, output EXT from logic device 84 rises to the "1" level and all other outputs therefrom drop to the "0" level.

4. Inputs EXT and RCV STATE are both at the "1" level while SIL is at the "0" level. Outputs SIL and PR DFn from logic device 84 rise to the "1" level while all other outputs drop to the "0" level. This means that, since an extrapolation was required to synthesize a lost packet, a silence must now be synthesized. Consequently, a dummy packet DFn is sent through gate 91.

Lastly, there remains the Table VII situation, namely, PS<CR, which is the most critical. Four cases are discussed below:

1. Inputs SIL and RCV STATE are both at the "1" logic level. The preceding TR2 cycle related to a silence period. Logic device 84 forces outputs CR UPD, PR FPQ and DEC PQC to the "1" level while all other outputs from device 84 drop to the "0" logic level. The effect of CR UPD="1" is to update the contents of counter 56. The contents of field PS as stored in register 64 are transferred to counter 81 through gate 89. The effect of PR FPQ="1" is to activate gate 90 and to cause the first packet in the buffer 54 queue to be sent to the synthesizer. Since DEC PQC="1", the count of counter 56 is decremented by unity.

2. With the exception of the RCV STATE line, all input lines to logic device 84 are at the "0" level. Outputs SIL, PR DFn and DEC PQC are at the "1" level while all other outputs are at the "0" level. A DFn packet is sent to the synthesizer to cause a 20-ms noise segment representing a pause to be generated. However, note that, since output DEC PQC="1", the count of counter 56 is decreased by unity. As a result, the system can gradually be brought back to a more normal situation.

3. Input lines EXT and RCV STATE are both at the "1" level while SIL and INT are both at the "0" level. Outputs SIL, PR DFn and DEC PQC rise to the "1" level while the other outputs from logic device 84 drop to the "0" level. The situation is the same as in 2 above. The count of counter PQC is, as above, decreased by unity.

4. Input lines RCV STATE and E are both at the "1" level while the other input lines are at the "0" level. At the output of device 84, lines EXT and DEC PQC rise to the "1" level while all other lines drop to the "0" level. The synthesizer receives no packet and gates 90 and 91 are closed. An extrapolation will be performed from the packet previously sent to the synthesizer. However, here again the count of counter PQC will be decreased by unity.

In summary, when bits INT and EXT are both "0" at the output of gate 92, the signal synthesizer will decode the packets of bits passing through gate 90 and 91 without attempting to determine whether these packets actually represent a talkspurt or a pause. Assuming that the talkspurt was coded by a VEPC type of coder in the VTU dedicated to telephone set T1, the contents of fields R1F and R2F in the received packets will be decoded using a VEPC-type of synthesizer (HSP) in the receiving VTU. For a more detailed description of suitable coders/decoders, reference may be made, for example, to aforementioned U.S. Pat. No. 4,216,354.

On the other hand, if either of the INT and EXT bits is "1", this means that a packet has been lost and must be reconstructed in order to be presented to the synthesizer/decoder. More precisely, if the EXT bit is "1" while the INT bit is "0", the synthesizer will reonstruct the lost data by extrapolating from the data contained in the previously received packet(s), in which case gates 90 and 91 will not be activated. If the EXT bit is "0" while the INT bit is "1", the lost data will be reconstructed by means of an interpolation between the data contained in one or more preceding packets and one or more subsequent packets. In this case, either one of gates 90 and 91 will be activated to pass data contained in a DFn-type of packet or in the leading packet in the buffer 54 queue (without however removing it form the queue). Data contained in fields R1F and R2F or in the DFn packet, as obtained at the output of gate 90 or 91, will be used together with one or more preceding packets to reconstruct the lost packet. Once the packet reconstruction operations have been carried out by means of an interpolation or an extrapolation process, the signal is synthesized in the same manner as in the case of a correctly received packet, using a VEPC type of synthesizer/decoder, for example.

A device for reconstructing lost packets by means of interpolations/extrapolations and to be used in conjunction with a VEPC-type of decoder is describe in European patent application No. 83430035.2 entitled "A Method of Reconstructing Lost Data in a Digital Voice Transmission System And Transmission System Using Said Method", filed by this applicant Oct. 28, 1983. To enhance the compatibility of the device described herein with that shown in FIG. 8 of the European patent application just mentioned, an interface circuit 99 has been added. Circuit 99 supplies data as well as two logic signals or validity bits V1 and V2. These bits have the same function as bits V1 and V2 mentioned in patent application No. 83430035.2 and are generated by interface circuit 99 from the EXT and INT bits provided here by register 86 through gate 92, that is, from the complementary information (COZ). The logic values of the V1 and V2 bits are as defined in Table XI.

TABLE XI

| EXT | INT | V1 | V2 | COMMENTS |
|---|---|---|---|---|
| 0 | 0 | 1 | * | Synthesize signal from received "DATA" packet. |
| 1 | 0 | 0 | 0 | Extrapolate. |
| 0 | 1 | 0 | 1 | Interpolate. |

Thus, bits V1 and V2 will serve to control the switches of the device described in the aforementioned patent application.

The data supplied by interface circuit 99 will consist of the bits contained in packets passing through gate 90 or 91 and will be directly fed to the demultiplexer (DMPX) of the device shown in FIG. 8 of said patent application.

While the invention has been particularly shown and described with reference to a preferred embodiment thereof, it will be understood by those skilled in the art that numerous changes in form and detail may be made therein without departing from the spirit and scope of the invention.

What is claimed is :

1. A method of transmitting voice signals generated by source terminals through a digital transmission network, in the form of packets of bits, characterized in that it includes, for each active source, the steps of:
    dividing the signal from said source into segments of predetermined duration, said segments being digitally coded;
    performing a so-called activity detection to detect segments corresponding to pauses of said sources; and,
    assembling bits derived from said coding in the form of packets, each packet containing bits from at least one voice signal segment and at least one header (H2) comprising in particular a parity bit whose value is changed subsequent to detection of a socalled long pause whose duration exceeds a predetermined time interval, and bits indicating a sequence number (PS);
each of said packets of bits being intended to be transmitted through said digital transmission network subject to a condition related to said activity detection being satisfied.

2. A transmission method according to claim 1, further characterized in that the beginnings and/or the ends of said pauses are denoted by indications provided by bits in predetermined fields of said packet header (H2).

3. A transmission method according to claim 2, characterized in that the upper limit of the value of said sequence number is said predetermined duration of a long pause.

4. A transmission method according to claim 3, further characterized in that the packets which may be supplied by one or more predetermined sets of sources are enqueued in the same node (GNE) of said network to be sequentially transmitted in a synchronous manner through said network.

5. A transmission method according to claim 4, further characterized in that said condition is defined as being such that only those packets which contain segments not corresponding to pauses are transmitted through the digital transmission network.

6. A transmission method according to claim 4, further characterized in that said condition is defined as a function of an activity detection involving several consecutive segments.

7. A transmission method according to claim 6, characterized in that said several consecutive segments are comprised of one or more segments relating to the packet being processed and a segment relating to the proceding packet.

8. A transmission method according to claim 7, further characterized in that each packet contains a second header (H1) comprising a logic channel reference for directing the packet concerned through the digital network.

9. A digital transmission method according to claim 8, further characterized in that said packet sequence number is reset to zero at the end of each of said long pauses, but is incremented sequentially both in the absence of a pause and during pauses whose duration is less than or equal to said predetermined time interval.

10. A digital transmission method according to any one of claims 1 to 9, further characterized in that it comprises at the receiving end the steps of:
    checking the validity of received packets intended for terminal T2 and enqueuing the valid packets; and,
    analyzing in sequence those received packets which are valid before transferring the contents of a packet to a decoder that will synthesize the signal to be presented to terminal T2, the transfer of said contents to said decoder being delayed by a given time interval, called retention delay, subsequent to detection, through said analysis, of a long pause.

11. A transmission method according to claim 10, further characterized in that said analysis of the received packets detects the end of a long pause by detecting a change in the logic value of said parity bit.

12. A transmission method according to claim 11, further characterized in that invalid packets eliminated from said queue are reconstructed at the receiving end by means of a packet interpolation or extrapolation process which makes use of the contents of the packet(s) near the invalid packet.

13. A transmission method according to claim 12, further characterized in that, during said pauses, the decoder receives so-called dummy packets that serve to generate a simulated ambient noise.

14. A transmission method according to claim 13, further characterized in that the value of a so-called error (E) bit is generated at the receiving end from the contents of the fields of bits which, in said header, indicate the beginning and the end of the pauses, said error bit being used to determine the type of packet to be fed to the decoder, namely, a packet placed on a queue or a dymmy packet.

15. A signal transmission device for implementing the method of any one of claims 1 to 5, characterized in that it comprises means for establishing a transmission path between a calling terminal (T1) and a called terminal (T2) through a digital Voice Packet Switching Network (VPSN), said path including at each end:
  a voice terminal unit (VTU) including a digital coder/decoder, with said coder sequentially dividing the voice signal into segments of predetermined duration and coding each segment by means of a BCPCM technique;
  means for connecting a VTU to one of terminals T1 and T2 through a telephone circuit switching unit;
  means for bringing together a given number of VTUs within the same voice terminal equipment (VTE), said VTE including, at the transmitting end, so-called voice activity detection means for identifying periods of inactivity or pauses of each VTU within said VTE; means for cyclically scanning said VTUs; and means for constructing packets of bits by using bits obtained through said coding and under the control of said activity detector;
  input/output node equipments (GNEs) pertaining to said digital network;
  means for connecting a given number of VTEs to each of said GNEs; and,
  means for moving the packets of bits between the GNE associated with terminal T1 and the GNE associated with terminal T2, through said voice packets switching network.

16. A transmission device according to claim 15, characterized in that, for transmitting purposes, each of said node equipments (GNEs) includes means for enqueuing packets supplied by the VTEs attached to said GNE.

17. A transmission device according to claim 16, characterized in that, for receiving purposes, each of said node equipments includes analysis means for analyzing the contents of said second header in each received packet to permit determining the destination terminal equipment (VTE), i.e. the VTE controlling the destination VTU, and for sending said packet to said destination VTU.

18. A transmission device according to claim 17, further characterized in that said destination terminal equipment (VTE) is determined by reference to a table that is updated when determining the transmission path defined at the time the connection between the calling terminal (T1) and the called terminal (T2) is established.

19. A transmission device according to claim 18, further characterized in that the destination terminal equipment (VTE) includes:
  first analysis means for analyzing the validity of each packet received;
  means connected to said analysis means for placing on the VTE queue valid packets intended for the same VTU, each packet containing said header including in particular the parity bit as well as the bits resulting form the coding of the voice signal;
  second analysis means connected to said VTE queue for analyzing the contents of said header, said second means including a logic retention device responsive to the value of the parity bit to hold up transmission, whenever the value of said parity bit changes, of the leading packet in the VTE queue for a given time interval called retention delay during which so-called dummy packets are sent to the decoder/synthesizer; and,
  logic reception means connected to said VTE queue and to said logic retention device and responsive to the contents of header H2 of the packet being processed and to at least one preceding packet to cause either the packet being processed or a dummy packet to be sent to a decoder/synthesizer.

20. A transmission device according to claim 19, further characterized in that said dummy packet is used by the synthesizer to generate a simulated ambient noise.

21. A transmission device according to claim 20, further characterized in that it includes a reception counter (CR) whose count is incremented by unity whenever a packet is sent to the decoder/synthesizer; and comparison means connected to said counter for comparing the count of said counter (CR) with the sequence number (PS) of the packet being processed, said comparison means feeding an information item to said logic reception means.

22. A transmission device according to claim 21, further characterized in that the information item fed to the logic reception means by the comparator causes a line to rise to the "1" logic level indicating the one of the following logic conditions: PS<CR, PS=CR, PS=CR+1 or PS>CR+1, which is satisfied.

23. A transmission device according to claim 22, further characterized in that the logic indication PS=CR+1 is used by the logic reception means either to cause a dummy packet to be transmitted or to indicate the loss of a packet to be reconstructed.

24. A transmission device according to claim 23, further characterized in that the indication PS<CR+1 denotes a critical situation that will cause, in particular, the value of the sequence number of the packet being processed to be forced into the reception counter.

* * * * *